Oct. 4, 1960 R. W. HUZZARD 2,954,708
AUTOMOBILE STEERING WHEELS
Filed Nov. 29, 1957 2 Sheets-Sheet 1
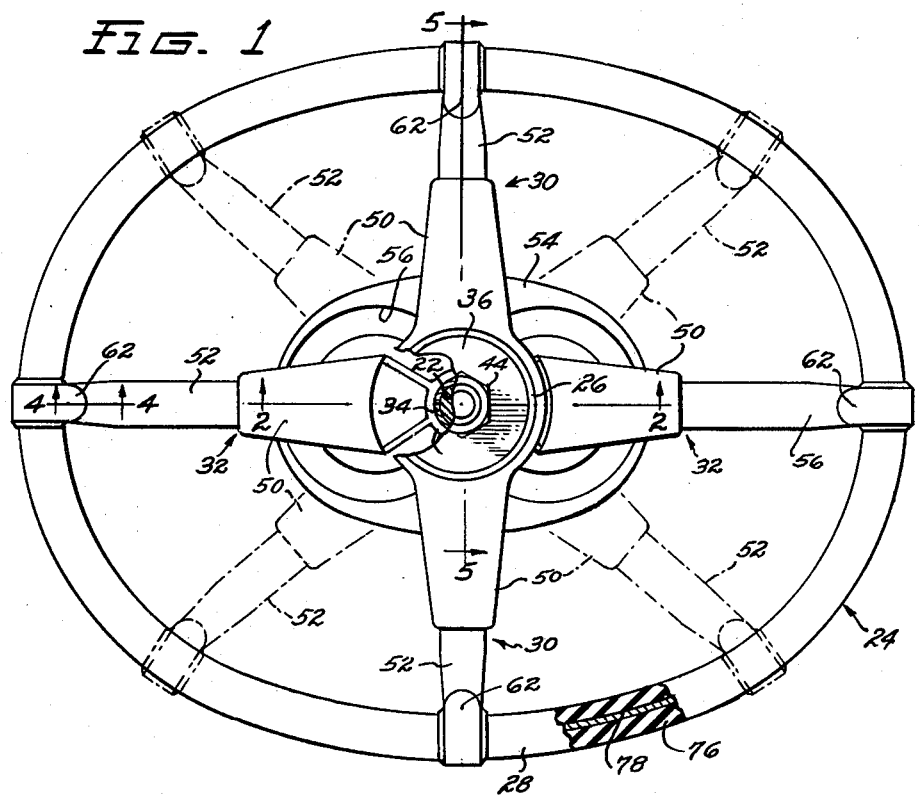
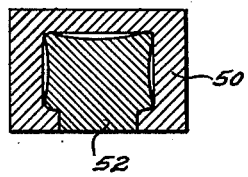
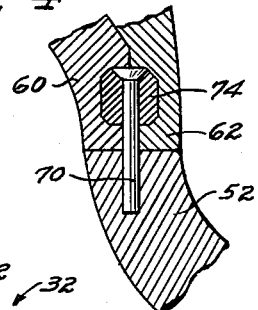
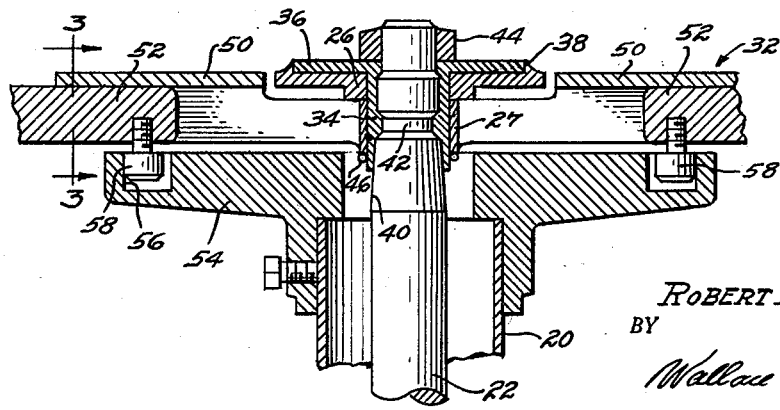
INVENTOR.
ROBERT W. HUZZARD
BY
Wallace P. Lamb
ATTORNEY.

Oct. 4, 1960
R. W. HUZZARD
2,954,708
AUTOMOBILE STEERING WHEELS
Filed Nov. 29, 1957
2 Sheets-Sheet 2
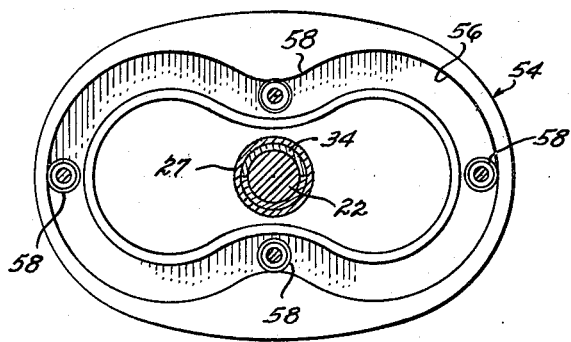
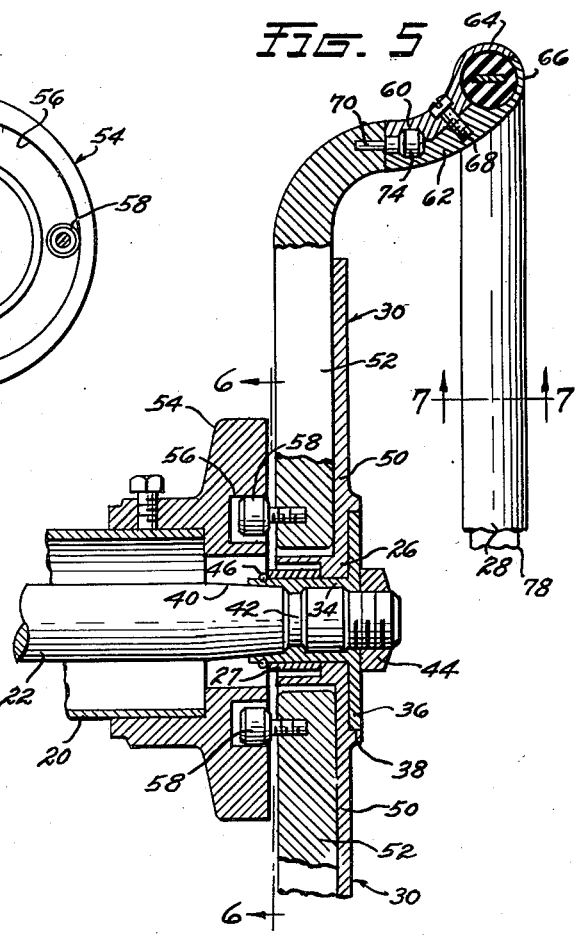
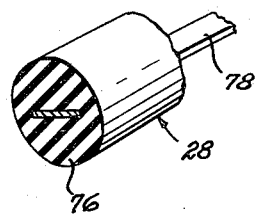
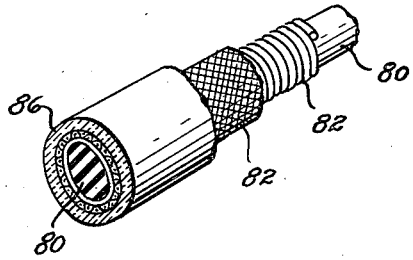
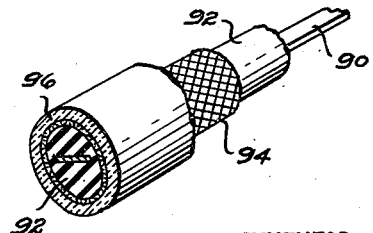
INVENTOR.
ROBERT W. HUZZARD.
BY
Wallace P. Lamb
ATTORNEY.

United States Patent Office 2,954,708
Patented Oct. 4, 1960

2,954,708
AUTOMOBILE STEERING WHEELS
Robert W. Huzzard, 35960 Leon Ave., Livonia, Mich.
Filed Nov. 29, 1957, Ser. No. 699,757
5 Claims. (Cl. 74—552)

This invention relates generally to motor vehicles and particularly to steering wheels therefor.

It has been well established that in the interests of steering control and leverage, a steering wheel is more satisfactory than an arm or other known means for steering a motor vehicle. However, in view of recent design trends of lowering vehicle bodies, windshields now extend below the steering wheel, thus impairing the vision of vehicle operators. The solution to this problem is not in lowering the steering wheel as the distance between the wheel and driver's seat is already insufficient for easy entrance and exit of the driver. Another consideration may be to reduce the diameter of steering wheels so that the wheel will not project into the windshield area, but this solution would detract from the leverage and control advantages of the present wheel. A further consideration of the problem might suggest the use of wheels of shapes other than circular, but obviously such wheels would be awkward to handle and as a consequence would detract from safe handling of the vehicle.

Accordingly, it is an object of my invention to provide an improved motor vehicle steering wheel which has a vertical dimension less than the diameter of current steering wheels without sacrificing any of the advantages of the latter.

Another object of the invention is to provide an elliptical steering wheel of a character such that the major and minor axes thereof remain fixed as the wheel rim is turned.

More specifically it is an object of my invention to retain the present advantages of control and ease of steering a motor vehicle while at the same time making it possible to avoid obstruction of the driver's view.

A further object of the invention is to provide a steering wheel having all of the advantages of conventional wheels plus the advantages of improved driver visibility over the wheel and more desirable clearance between the wheel and the driver's seat.

Other objects of my invention will become apparent from the following detail description taken in connection with the accompanying two sheets of drawings in which;

Fig. 1 is a plan view of a motor vehicle steering wheel embodying features of my invention;

Fig. 2 is a sectional view, taken along line 2—2 of Fig. 1;

Fig. 3 is a detail cross sectional view taken along line 3—3 of Fig. 2;

Fig. 4 is another detail cross sectional view, taken along line 4—4 of Fig. 1;

Fig. 5 is a cross sectional view taken along line 5—5 of Fig. 1;

Fig. 6 is a vertical sectional view, taken along line 6—6 of Fig. 5;

Fig. 7 is a fragmentary view in section, taken substantially along line 7—7 of Fig. 5, and Figs. 8 and 9 are modifications of the structure of Fig. 7.

Referring to the drawings by characters or reference, the numeral 20 designates the conventional automobile steering column or post 20 wherein is journaled the usual steering shaft 22. An upper end portion of the shaft 22 projects above the upper end of the column 20 and secured to the upper end of shaft 22 is my improved steering wheel, designated generally by the numeral 24.

The steering wheel 24 comprises in general, a hub 26, a second hub 27, an elliptical flexible rim 28 and a plurality of extensible-contractable steering arms of spokes 30 and rim guide arms 32. The steering wheel 24 is arranged on the steering shaft 22 such that the minor axis thereof is vertical, thus increasing visibility of the vehicle operator and at the same time increasing clearance between the steering wheel and the driver's seat. The horizontal or major axis of the elliptical wheel 24 may be made equal to the diameter of conventional circular steering wheels so as to retain the desired leverage at the major axis. Radially spaced about the hub 26, the spokes 30 connect the elliptical rim 28 to the hub 26 and the spokes 32 connect the rim to the hub 27 in such manner that the flexible rim 28 can be turned to turn the steering shaft 22 without changing the positions of the major and minor axes of the rim.

Referring now in detail to the steering wheel structure, the hub 26 fits snugly over a sleeve 34 which has a large clamping flange 36 at its upper end that seats flush in a recess 38 in the upper face of hub 26. To hold the sleeve 34 against movement along the steering shaft, the shaft is formed with a taper 40 and shoulders 42, and the inner surface of the sleeve is formed complemental to said taper and shoulders. A nut 44 is threaded onto the upper end of shaft 22 and tightened down against the sleeve flange 36 whereby to frictionally clamp the hub 26, sleeve 34 and shaft 22 together. To the interests of assembly of the wheel on shaft 22, the sleeve 34 may be a split sleeve made up of two semi-cylindrical parts, as shown.

Rotatable on sleeve 34 below hub 26 is the hub 27 for the rim guide arms 32, the hub 27 being held against downward movement on sleeve 34 by a snap-in retainer ring 46 which also limits downward movement of hub 26. Whereas hub 26 is fixed to the steering shaft 22 to transmit thereto turning movement of rim 24, hub 27 is freely rotatable on sleeve 34 for a purpose hereinafter described.

The spokes 30 and guide arms 32 are radially equally spaced about the rim 24, spokes 30 being diametrically opposite each other and arms 32 also being diametrically opposite each other, as shown. Each of the spokes 30 and arms 32 comprise an inner hollow spoke component or section 50 and an outer spoke component or section 52. The sections 50 and 52 of each spoke 30 and arms 32 are slidably engaged or telescoped so that the outer sections 52 move in and out of the inner sections 50. The inner spoke sections 50 of spokes 30 are integral at the inner ends thereof with the fixed hub 26 and the inner spoke sections 50 of arms 32 are integral at the inner ends thereof with the freely rotatable hub 27.

Secured to and overlying the upper end of the steering column 20 is a cam 54 which is provided in its outer surface with a recessed track having a cam surface 56 designed to cause the flexible steering wheel rim 28 to follow the predetermined elliptical path. Carried by each of the radially movable outer spoke sections 52 is a cam follower 58, preferable a roller arranged to follow around the cam surface 56 as the wheel rim 28 is turned. The spokes 30 transmit turning of rim 28 to the steering shaft whereas the spokes 30 and arms 32 act under control of the cam to maintain the elliptical shape of the steering wheel rim 28.

The outer spoke sections 52 are connected at their outer ends to the rim by connectors, each of which comprises clamping sections 60 and 62 (see Fig. 5), that have cooperating cylindrical portions 64 and 66 which clamp around the steering wheel rim 28. Screws 68 tightly secure the clamping sections 60 and 62 together.

Press fitted or otherwise secured in each end of outer sections 52 is a hinge pintle or pivot pin 70 that pivotally connect the outer spoke sections individually to the flexible rim 28. Each of the pivot pins 70 has a head that is clamped in a socket 74 formed by and between the clamping sections 60 and 62 adjacent the ends opposite rim 28. The sockets 74 retain the heads of the pivot pins 70 to attach the spokes and wheel rim 28 together but have clearance for allowing pivoting of the pins relative to the clamping sections 60 and 62.

It will now be seen that as the wheel rim is turned by the operator of a vehicle, such motion is transmitted through spokes 30 to the steering shaft 22 and that as the rim 28 is turned the extensible-contractable spokes guided by the cam surface 56 and by the extensible-contractable arms 32 restrain the flexible rim to travel an elliptical path so that the axes of the ellipse remain fixed. When the wheel 24 is turned, as shown in dot and dash lines in Fig. 1, the spokes pivot at their outer ends in accordance with the changing distance of a point on the rim relative to the axis of the steering shaft 22 and the elliptical form of the flexible rim 28 is maintained by reason of the freely pivotal arms 32 moving relative to the spokes 30 as the rim is turned through its elliptical path.

With respect to the construction of the wheel rim 28, the desired construction is one which is sufficiently flexible to follow the elliptical path required yet one which is sufficiently firm for steering purposes. Such a rim construction is shown in Fig. 7 in which a rubber rim 76 of substantially circular cross section is reinforced by a spring strip 78 that is encased in the rubber and extends entirely around the rim acting to stiffen the rim. If desired, the rim covering may be made of a suitable plastic material.

In Fig. 8 is a modified but more expensive rim structure than that of Fig. 7. In the structure of Fig. 8, an inner rubber core 80 is wrapped with a reinforcing or spring wire 82 which in turn is covered by a wire mesh 84 over which is the outer cover 86 that may be of flexible plastic material, as indicated, or of rubber.

Another modification of a resilient steering wheel rim, as shown in Fig. 9 includes a spring strip 90 encased in a resilient rubber casing 92 that is covered by reinforcing screening 94 having an outer covering 96 of plastic material, as indicated, or rubber, if desired.

From the foregoing description, it will now be understood that I have provided an improved automobile steering wheel which because of its configuration makes it possible to arrange the wheel so as to increase driver visibility and at the same time increase clearance between the wheel and the driver's seat. This is accomplished by providing an elliptical steering wheel that can be positioned with the fixed major axis extending transversely of the vehicle. Standard wheel leverage and ease of steering is maintained by a novel wheel construction of a character such that turning of the rim does not change the positions of the axes of the ellipse thus providing the desired wheel leverage without sacrificing driver visibility.

While I have shown and described my invention in considerable detail it will be understood that the invention is to be limited only by the spirit and scope of the appended claims.

What I claim is:

1. A steering wheel for a motor vehicle having a steering shaft, a support, a hub to be fixed to the steering shaft, a second hub freely rotatable about the axis of said first hub and on said support, a pair of radially spaced steering arms connecting said rim to said first hub, each of said pair of steering arms having inner and outer telescoping sections, said inner sections fixed to said first hub and said outer sections pivoted at their outer ends to said rim, a pair of radially spaced rim guiding arms connecting said rim to said second hub, each of said rim guiding arms having inner and outer telescoping sections, said inner sections of said rim guiding arms fixed to said second hub and said outer sections of said rim guiding arms pivoted to said rim, a cam fixed to said support having a cam surface corresponding to said elliptical path of travel, and cam followers carried by each of the outer sections and engaging said cam surface.

2. A steering wheel for a motor vehicle having a steering shaft, a sleeve shaft to fit over and be secured to the steering shaft, a hub fitting over and to be secured to said sleeve, a flexible rim adapted to rotate about the axis of said hub and follow an elliptical path, a pair of inner hollow steering arm sections diametrically oppositely disposed and integrally connected to said hub, a second pair of inner hollow guide arm sections connected to said second hub, said first and second sections relatively movable axially, outer arm sections slidably received respectively in said hollow sections and having outer ends pivoted to said rim in spaced relation thereabout, a fixed cam surrounding said sleeve having a cam surface corresponding to said elliptical path, a support for said cam, and a cam follower on each of said outer sections engaging said cam surface.

3. A steering wheel for a motor vehicle having a steering shaft and a support comprising a hub to be fixed to the shaft to rotate therewith, a second hub for free rotation on the shaft, a flexible rim adapted to rotate through an elliptical path about the axis of the shaft and in a plane transverse thereto, a plurality of radially spaced arms, some of said arms connecting said rim to one of said hubs and the remaining ones of said arms connecting said rim to the other of said hubs, each of said arms sectionally constructed having relatively movable outer and inner sections, a cam to be fixed to the support and corresponding to the elliptical path, and cam followers on the outer arm sections engaging said cam to move the outer arm sections radially on turning of said rim.

4. A steering wheel for a motor vehicle having a steering shaft and a support comprising a hub to be fixed on and to the shaft, a second hub freely rotatable on the first, a flexible rim in a plane transverse to the axes of said hubs and to be held in the form of an ellipse irrespective of rotation of the rim and without changing the positions of the major and minor axes of the ellipse, a pair of diametrically oppositely disposed steering arms each having an inner section connected to the first hub and an outer section slidably connected to the inner sections and pivoted to said rim, a second pair of diametrically oppositely disposed guide arms each having an inner section connected to said first hub and an outer section slidably connected to inner guide arm sections and pivotally connected to said rim, said steering arms and said guide arms coplanar, a cam to be fixed to support having a cam surface corresponding to the elliptical path of rotation of said rim, and cam followers on each of said outer sections engaging said cam surfaces.

5. A steering wheel for a motor vehicle having a steering shaft and a support comprising a pair of relatively rotatable hubs in axial alignment, one of said hubs to be fixed to the steering shaft and the other of said hubs freely rotatable on said support, a flexible rim rotatatable through an elliptical path in a plane transverse to the axes of said hubs, a pair of diametrically oppositely disposed steering arms normally positioned along the minor axis of the elliptical path, each of said steering arms having an inner section fixed to said one hub and a relatively axially movable outer section pivotally connected to said flexible rim, a pair of diametrically oppositely disposed guide arms normally positioned along the major axis of said elliptical path, each of said guide arms having an inner section connected to the other of said hubs and a relatively axially movable outer section pivotally connected to said rim, a cam to be mounted on the support having a cam surface corresponding to said elliptical path, and cam followers respectively on the outer sections of each of said arms and engaging said cam surface.

References Cited in the file of this patent

UNITED STATES PATENTS

| | | |
|---|---|---|
| 622,880 | Brandenburg | Apr. 11, 1899 |
| 1,430,733 | Elzey | Oct. 3, 1922 |
| 1,492,363 | Edson | Apr. 29, 1924 |
| 2,507,106 | Knapp | May 9, 1950 |
| 2,596,784 | Nagin | May 13, 1952 |
| 2,657,589 | Sampson | Nov. 3, 1953 |
| 2,799,180 | Madnuich | July 16, 1957 |
| 2,909,941 | Guest | Oct. 27, 1959 |

FOREIGN PATENTS

| | | |
|---|---|---|
| 590,360 | France | Mar. 16, 1925 |